(12) United States Patent
Ishida et al.

(10) Patent No.: US 6,882,110 B2
(45) Date of Patent: Apr. 19, 2005

(54) HEADLAMP FOR VEHICLE

(75) Inventors: Hiroyuki Ishida, Shizuoka (JP);
Kiyoshi Sazuka, Shizuoka (JP);
Masashi Tatsukawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/652,243

(22) Filed: Sep. 2, 2003

(65) Prior Publication Data
US 2004/0125614 A1 Jul. 1, 2004

(30) Foreign Application Priority Data

Sep. 3, 2002 (JP) .................................... P. 2002-258102

(51) Int. Cl.[7] ................................................ B60Q 1/02
(52) U.S. Cl. .................... 315/82; 362/507; 362/544; 362/800
(58) Field of Search ............................. 315/77, 82, 76; 362/543–545, 538, 539, 517, 507, 459, 800

(56) References Cited

U.S. PATENT DOCUMENTS

| | | | | |
|---|---|---|---|---|
| 5,803,579 A | * | 9/1998 | Turnbull et al. ............ | 362/800 |
| 5,975,730 A | | 11/1999 | Neumann et al. ............ | 362/517 |
| 6,406,172 B1 | * | 6/2002 | Harbers et al. ............. | 362/545 |
| 6,511,215 B1 | * | 1/2003 | Hashigaya .................. | 362/544 |
| 6,565,247 B1 | * | 5/2003 | Thominet .................... | 362/545 |
| 6,619,825 B1 | * | 9/2003 | Natsume ...................... | 362/545 |
| 2002/0067618 A1 | | 6/2002 | Woerner et al. ............ | 362/511 |
| 2004/0042212 A1 | * | 3/2004 | Du et al. .................... | 362/296 |

FOREIGN PATENT DOCUMENTS

| | | |
|---|---|---|
| JP | 2001-266620 A | 9/2001 |
| JP | 2002-50214 A | 2/2002 |
| WO | WO 99/48721 A1 | 9/1999 |

* cited by examiner

Primary Examiner—Tuyet Vo
Assistant Examiner—Ephrem Alemu
(74) Attorney, Agent, or Firm—Sughrue Mion, PLLC

(57) ABSTRACT

A headlamp having a plurality of lighting units using light emitting diodes as light sources. A cutoff line forming unit, hot zone forming units, and a diffusion region forming unit are used as these lighting units. Consequently, a light distribution pattern for a low beam having a desirable pattern shape and light intensity distribution can be obtained as the synthetic light distribution pattern of light distribution patterns formed by the irradiation of a light from these three kinds of lighting units.

7 Claims, 12 Drawing Sheets

HEADLAMP FOR VEHICLE

BACKGROUND OF THE INVENTION

1. Technical Field to which the Invention Belongs

The present invention relates to a headlamp for a vehicle that is constituted to form a light distribution pattern for a low beam using a plurality of semiconductor light emitting elements as light sources.

2. Description of the Related Art

In a marker lamp for a vehicle such as a tail lamp, a light emitting diode is often used as the light source. For example, JP-A-2002-50214 describes a marker lamp for a vehicle in which a plurality of lighting units using light emitting diodes to be light sources are arranged.

In addition, JP-A-2001-266620 describes a headlamp for a vehicle which has such a structure such that a part of a plurality of light emitting diodes arranged in a matrix is selectively turned on to form a desirable light distribution pattern.

In the structure of the lighting unit described in JP-A-2001-266620, it is possible to change the shape of a light distribution pattern by dividing a region for turn on/off. However, it is hard to form a light distribution pattern with a desirable luminous intensity distribution.

On the other hand, it can also be supposed that the structure of a lighting unit in which a plurality of lighting units using light emitting diodes to be light sources are arranged as described in JP-A-2002-50214 is applied to a headlamp for a vehicle. In such a case, there is the following problem.

More specifically, if the same lighting units are simply used as described in JP-A-2002-50214, light distribution patterns formed by a light irradiation from the lighting units have pattern shapes and luminous intensity distributions which are identical to each other. Therefore, there is a problem in that the light distribution pattern of the headlamp for a vehicle which is obtained as a synthetic light distribution pattern cannot be formed with a desirable pattern shape and luminous intensity distribution. In this case, furthermore, it is very hard to form a light distribution pattern for a low beam having a cutoff line as the light distribution pattern of the headlamp for a vehicle.

The invention has been made in consideration of such circumstances and has an object to provide a headlamp for a vehicle having such a structure as to form a light distribution pattern for a low beam in which a light distribution pattern for a low beam can be formed with a desirable pattern shape and luminous intensity distribution also in the case in which a semiconductor light emitting element is used as a light source thereof.

SUMMARY OF THE INVENTION

In the invention, a plurality of lighting units using semiconductor light emitting elements as light sources are provided and plural kinds of light distribution patterns having different light distribution characteristics can be formed by the lighting units, thereby attaining the object.

More specifically, the invention provides a headlamp for a vehicle which is constituted to form a light distribution pattern for a low beam, comprising:

a plurality of lighting units using semiconductor light emitting elements as light sources, wherein a cutoff line forming unit for carrying out a light irradiation to form a cutoff line of the light distribution pattern for a low beam, a hot zone forming unit for carrying out a light irradiation to form a hot zone of the light distribution pattern for a low beam and a diffusion region forming unit for carrying out a light irradiation to form a diffusion region of the light distribution pattern for a low beam are used as the lighting units.

Here, the term "vehicle" can apply to any number of transportation modes such as, for example, an automobile, a railcar, etc.

The type of "semiconductor light emitting element" is not particularly restricted and a light emitting diode or a laser diode can be employed, for example. Moreover, the specific structure of the "semiconductor light emitting element" is not particularly restricted and a single light emitting chip may be mounted or a plurality of light emitting chips maybe mounted, for example.

The specific structure of the lighting unit of each of the "cutoff line forming unit", the "hot zone forming unit" and the "diffusion region forming unit" is not particularly restricted, and furthermore, the number of the lighting units may be one or more.

While the headlamp for a vehicle according to the invention is constituted to form a light distribution pattern for a low beam as is indicated in the structure, it comprises a plurality of lighting units using semiconductor light emitting elements as light sources and the cutoff line forming unit, the hot zone forming unit and the diffusion region forming unit are used as the lighting units. Therefore, the following functions and advantages can be obtained.

More specifically, it is possible to form a cutoff line, a hot zone and a diffusion region by using the cutoff line forming unit, the hot zone forming unit and the diffusion region forming unit. Therefore, it is possible to obtain a light distribution pattern for a low beam having a desirable pattern shape and luminous intensity distribution by properly combining these three kinds of lighting units.

According to the invention, thus, in the headlamp for a vehicle which is constituted to form a light distribution pattern for a low beam, a light distribution pattern for a low beam can be formed with a desirable pattern shape and luminous intensity distribution also in the case in which the semiconductor light emitting element is used as a light source thereof.

In addition, the headlamp for a vehicle according to the invention comprises a plurality of lighting units using semiconductor light emitting elements as light sources. Therefore, the size of each lighting unit can be reduced. Consequently, it is possible to increase the degree of freedom of the shape of the headlamp for a vehicle and to reduce a size thereof.

In the structure, if a lighting unit of a projector type which is constituted to reflect a light emitted from a light source to be converged forward by a reflector and to irradiate the reflected light forward from the lighting unit through a projection lens provided in a forward part of the reflector is used as the cutoff line forming unit, a lighting unit of a direct projection type which is constituted to irradiate a direct light emitted from the light source forward from the lighting unit through a condenser lens provided in a forward part of the light source is used as the hot zone forming unit, and a lighting unit of a reflection type which is constituted to reflect a light emitted from the light source forward from the lighting unit by the reflector is used as the diffusion region forming unit, the following functions and advantages can be obtained.

More specifically, since the lighting unit of a projector type forward projects an image on a focal plane at the rear side of a projection lens, it is suitable for forming a light distribution pattern having a certain diffusion angle with a comparatively uniform luminous intensity distribution. Moreover, it is also possible to easily form a cutoff line having a high contrast ratio. If the lighting unit of a projector type is used as the cutoff line forming unit, accordingly, the generation of an upward light causing glare can be minimized.

Moreover, the lighting unit of a direct projection type is suitable for forming a spot-like light distribution pattern, and the lighting unit of a reflection type is suitable for causing the reflecting plane of the reflector to have a diffusing function or providing a diffusion lens in the front part of the reflector, thereby forming a light distribution pattern having a great diffusion angle. If the lighting unit of a direct projection type is used as the hot zone forming unit and the lighting unit of a reflection type is used as the diffusion region forming unit, accordingly, it is possible to easily form a light distribution pattern for a low beam with a desirable pattern shape and luminous intensity distribution.

If three kinds of lighting units, that is, the cutoff line forming unit, the hot zone forming unit and the diffusion region forming unit are provided in three upper and lower stages with the cutoff line forming unit positioned in a middle stage in the structure, the following functions and advantages can be obtained.

More specifically, a position in which the light distribution pattern for a low beam is to be formed is generally regulated on the basis of the position of a cutoff line. If the cutoff line forming unit is provided in the middle stage, therefore, the optical axis of a lighting unit positioned in the central part of the lighting unit is regulated and the optical axis of another lighting unit can be then regulated. Consequently, the optical axis of each lighting unit can easily be regulated.

DETAILED DESCRIPTION OF THE INVENTION

An embodiment of the invention will be described below with reference to the drawings.

Figure 1:
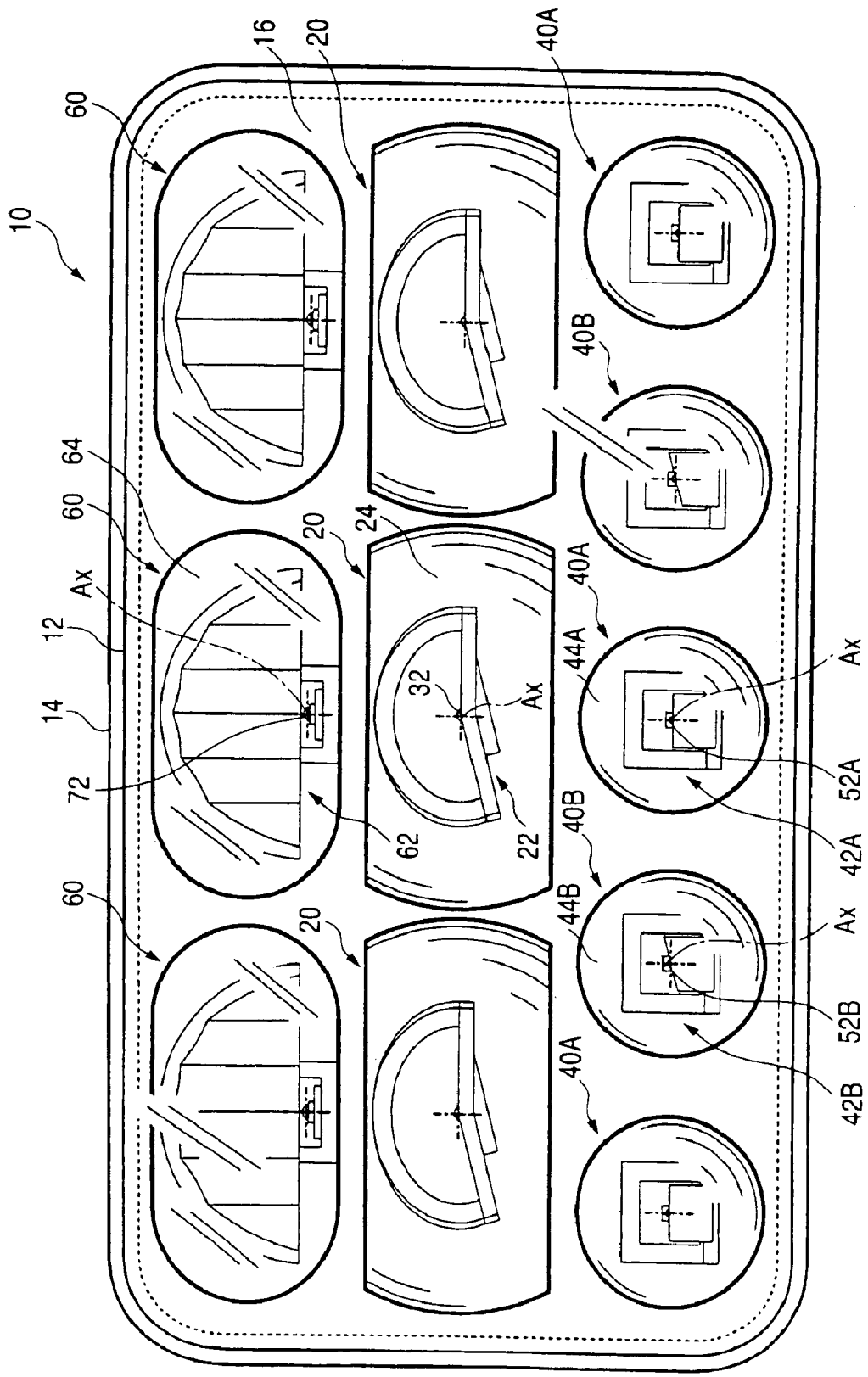
FIG. 1 is a front view showing a headlamp for a vehicle according to an embodiment of the invention.

FIG. 1 is a front view showing a headlamp 10 for a vehicle according to an embodiment of the invention.

The headlamp 10 for a vehicle is a headlamp for a low beam and has such a structure that eleven lighting units 20, 40A, 40B and 60 are accommodated in three upper and lower stages in a lamp housing formed by a plain translucent cover 12 and a lamp body 14.

Figure 2:
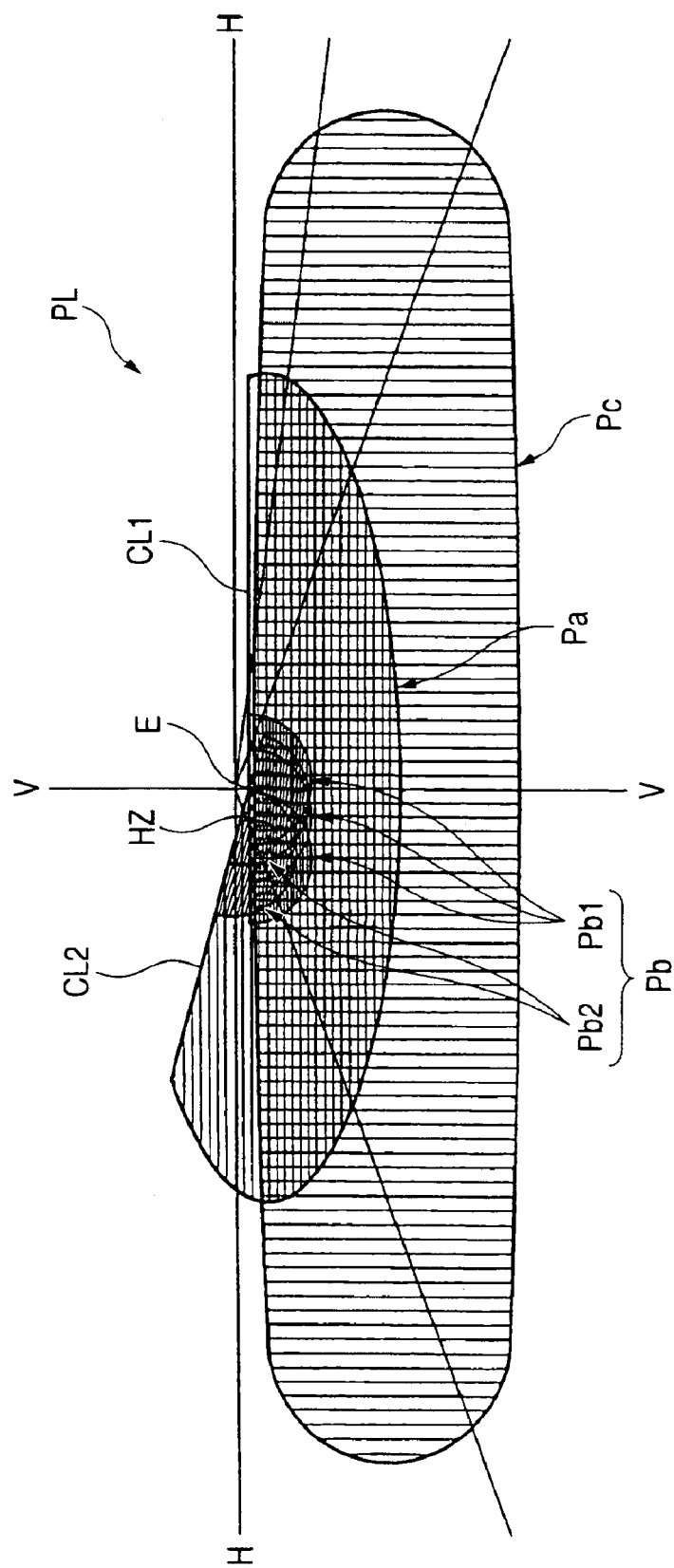
FIG. 2 is a perspective view showing a light distribution pattern for a low beam which is formed on a virtual vertical screen provided in a forward position of 25 m from a lighting unit by the irradiation of a light from the headlamp for vehicle.

FIG. 2 is a perspective view showing a light distribution pattern PL for a low beam which is formed on a virtual vertical screen provided in a forward position of 25 m from a lighting unit by a light irradiated forward from the headlamp 10 for a vehicle.

The light distribution pattern PL for a low beam is a left light distribution pattern having horizontal and oblique cutoff lines CL1 and CL2 on an upper edge thereof, and the position of an elbow point E to be an intersection of both of the cutoff lines is set into a downward position by approximately 0.5 to 0.6 degree of H–V to be a vanishing point in the front direction of the lighting unit. In the light distribution pattern PL for a low beam, a hot zone HZ to be a high luminous intensity region is formed to surround the elbow point E slightly to the left.

The light distribution pattern PL for a low beam is formed to be the synthetic light distribution pattern of a cutoff line forming pattern Pa, a hot zone forming pattern Pb and a diffusion region forming pattern Pc.

The cutoff line forming pattern Pa is a light distribution pattern for forming the horizontal and oblique cutoff lines CL1 and CL2, and is formed by the three lighting units 20 provided in the middle stage.

The hot zone forming pattern Pb is a comparatively small light distribution pattern for forming a hot zone HZ, and is constituted by three small light distribution patterns Pb1 having straight upper edges along the horizontal cutoff line CL1 and two small light distribution patterns Pb2 having straight upper edges along the oblique cutoff line CL2. The three small light distribution patterns Pb1 are formed by a light irradiation from the three lighting units 40A provided alternately in the lower stage, and the two small light distribution patterns Pb2 are formed by two residual lighting units 40B provided in the lower stage.

The diffusion region forming pattern Pc is a light distribution pattern for forming the diffusion region of the light distribution pattern PL for a low beam, and is formed to be a greater light distribution pattern than the cutoff line forming pattern Pa below the horizontal cutoff line CL1. The diffusion region forming pattern Pc is formed by the three lighting units 60 provided in the upper stage.

The lighting unit 20 functioning as the cutoff line forming unit is constituted as a lighting unit of a projector type comprising a light source unit 22 and a projection lens 24 provided on the forward side thereof. The lighting units 40A and 40B functioning as the hot zone forming units are constituted as a lighting unit of a direct projection type comprising light source units 42A and 42B and condenser lenses 44A and 44B provided on the forward side thereof. The lighting unit 60 functioning as the diffusion region forming unit is constituted as a lighting unit of a reflection type comprising a light source unit 62 and a plain translucent plate 64 provided on the forward side thereof.

Both of the lighting units 20 and 60 are provided in such a manner that their optical axes Ax are extended in the longitudinal direction of a vehicle. On the other hand, the lighting units 40A and 40B are provided in such a manner that their optical axes Ax are extended in a slightly shifted direction from the longitudinal direction of the vehicle for each of them. The optical axes Ax of the lighting units 20, 40A, 40B and 60 are accurately extended in a downward direction by approximately 0.5 to 0.6 degree with respect to a horizontal direction.

The projection lens 24 is formed to take an oval shape as seen from the front of the lighting unit, the condenser lenses 44A and 44B are formed circularly as seen from the front of the lighting unit, and the translucent plate 64 is formed to take an elliptical shape as seen from the front of the lighting unit. An inner panel 16 formed to surround the projection lens 24, the condenser lenses 44A and 44B and the translucent plate 64 is provided in the lamp housing.

The specific structures of the lighting units 20, 40A, 40B and 60 will be described below.

First, the structure of the lighting unit 20 of a projector type will be described.

Figure 3:
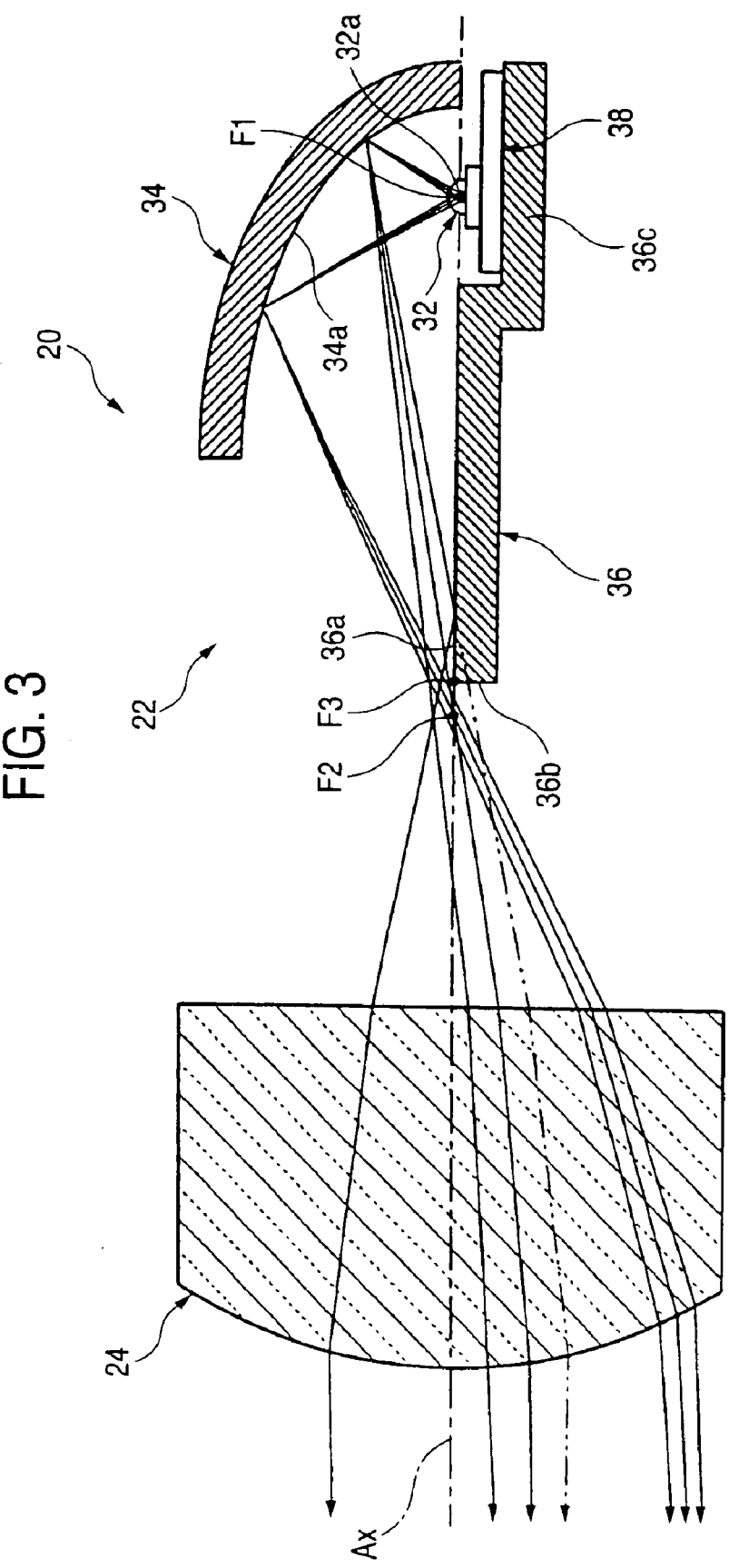
FIG. 3 is a sectional side view showing, as a single product, a lighting unit of a projector type in the headlamp for a vehicle.
Figure 4:
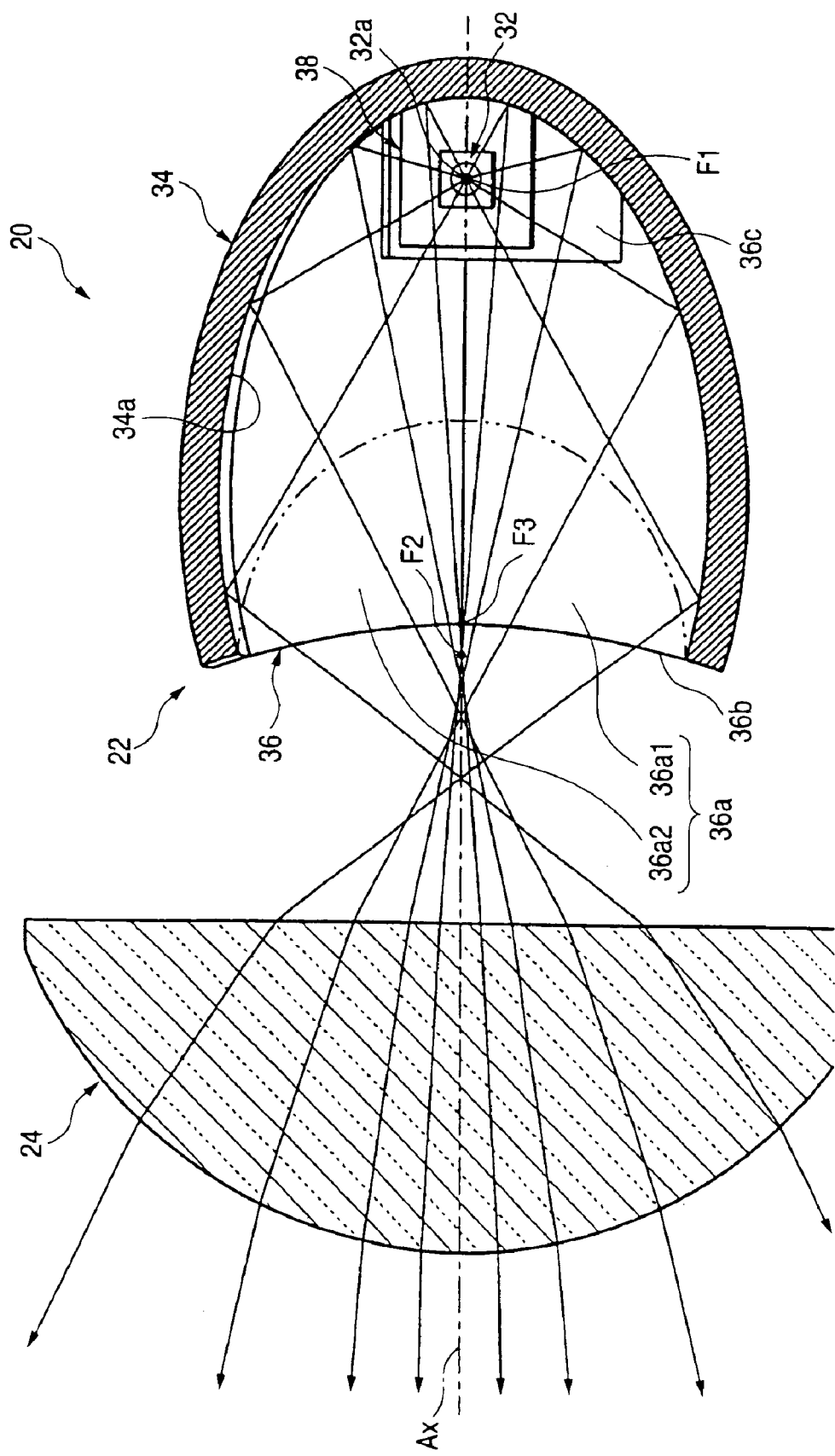
FIG. 4 is a sectional plan view showing the lighting unit of a projector type.

FIG. 3 is a sectional side view showing the lighting unit 20 as a single product and FIG. 4 is a sectional plan view thereof.

As shown in these drawings, the light source unit 22 of the lighting unit 20 comprises a light emitting diode 32 to be a light source, a reflector 34 and a light control member 36.

The light emitting diode 32 is a white light emitting diode including a single light emitting chip 32a having a size of approximately 1 mm square, and is disposed on a substrate 38 and is provided to be turned in a direction of a rightward rotation of 15 degrees around the optical axis Ax with respect to an upper part in a vertical direction on the optical axis Ax in this state.

The reflector 34 is an almost dome-shaped member provided on the upper side of the light emitting diode 32, and has a reflecting plane 34a for reflecting a light emitted from the light emitting diode 32 to be converged forward to the optical axis Ax. The reflecting plane 34a is formed in such a manner that a distance in a vertical direction from the light emitting diode 32 to the reflecting plane 34a is approximately 10 mm.

The reflecting plane 34a is formed to take the shape of an almost elliptical sphere with the optical axis Ax to be a central axis. More specifically, the reflecting plane 34a has a sectional shape including the optical axis Ax to take the shape of an almost ellipse and has an eccentricity thereof set to be increased gradually from a vertical section toward a horizontal section. Vertices on the rear side of the ellipse forming the sections are set into the same position. The light emitting diode 32 is provided on a first focal point F1 of the ellipse forming the vertical section of the reflecting plane 34a. Consequently, the reflecting plane 34a reflects a light emitted from the light emitting diode 32 to be converged forward to the optical axis Ax, and almost converges the light onto a second focal point F2 of the ellipse in the vertical section including the optical axis Ax in that case.

The projection lens 24 of the lighting unit 20 is constituted by a plano-convex lens in which a surface on the forward side is convex and a surface on the rear side is plane, and both upper and lower sides thereof are chamfered. The projection lens 24 is provided on the optical axis Ax to cause a focal point F3 on the rear side to be positioned slightly rearward from the second focal point F2 of the reflecting plane 34a of the reflector 34. Consequently, an image on a focal plane including the focal point F3 on the rear side is projected forward as an inverted image.

The light control member 36 is a plate-shaped member provided below the reflector 34 and is formed to almost take such a shape that one side is provided downward as seen from the front of the lighting unit, and an upper surface thereof is provided with a light control surface 36a subjected to a reflecting plane processing. The light control member 36 upward reflects a part of a light reflected from the reflecting plane 34a in the light control surface 36a to carry out such control as to convert a light to be emitted upward from the projection lens 24 into a light to be emitted downward from the projection lens 24, thereby enhancing the luminous flux utilization factor of the light emitted from the light emitting diode 32.

More specifically, the light control surface 36a comprises a horizontal cutoff formation surface 36a1 extended from the optical axis Ax leftwards and horizontally and an obliqlue cutoff formation surface 36a2 extended from the optical axis Ax rightwards, obliquely and downward by 15 degrees, and a front edge thereof (that is, a ridge line between the light control surface 36a and a front end face 36b of the light control member 36) is formed to pass through the focal point F3 on the rear side of the projection lens 24. A light emitted from the light emitting diode 32 and reflected by the reflecting plane 34a of the reflector 34 is partially incident on the light control surface 36a of the light control member 36 and the residual light is exactly incident on the projection lens 24. In that case, the light incident on the light control surface 36a is reflected upward by the light control surface 36a and is incident on the projection lens 24, and is emitted as a downward light from the projection lens 24.

The front end face 36b of the light control member 36 is formed to have both left and right sides curved forward as seen on a plane in order to correspond to the curvature of the image plane of the projection lens 24.

A substrate support section 36c is formed on the rear end of the light control member 36 and a substrate 38 is fixed to the light control member 36 in the substrate support section 36c. Moreover, the reflector 34 is fixed to the light control member 36 in the peripheral edge portion of a lower end thereof. The light source unit 22, together with the projection lens 24, is fixed to the lamp body 14 through a bracket which is not shown.

Figure 5:
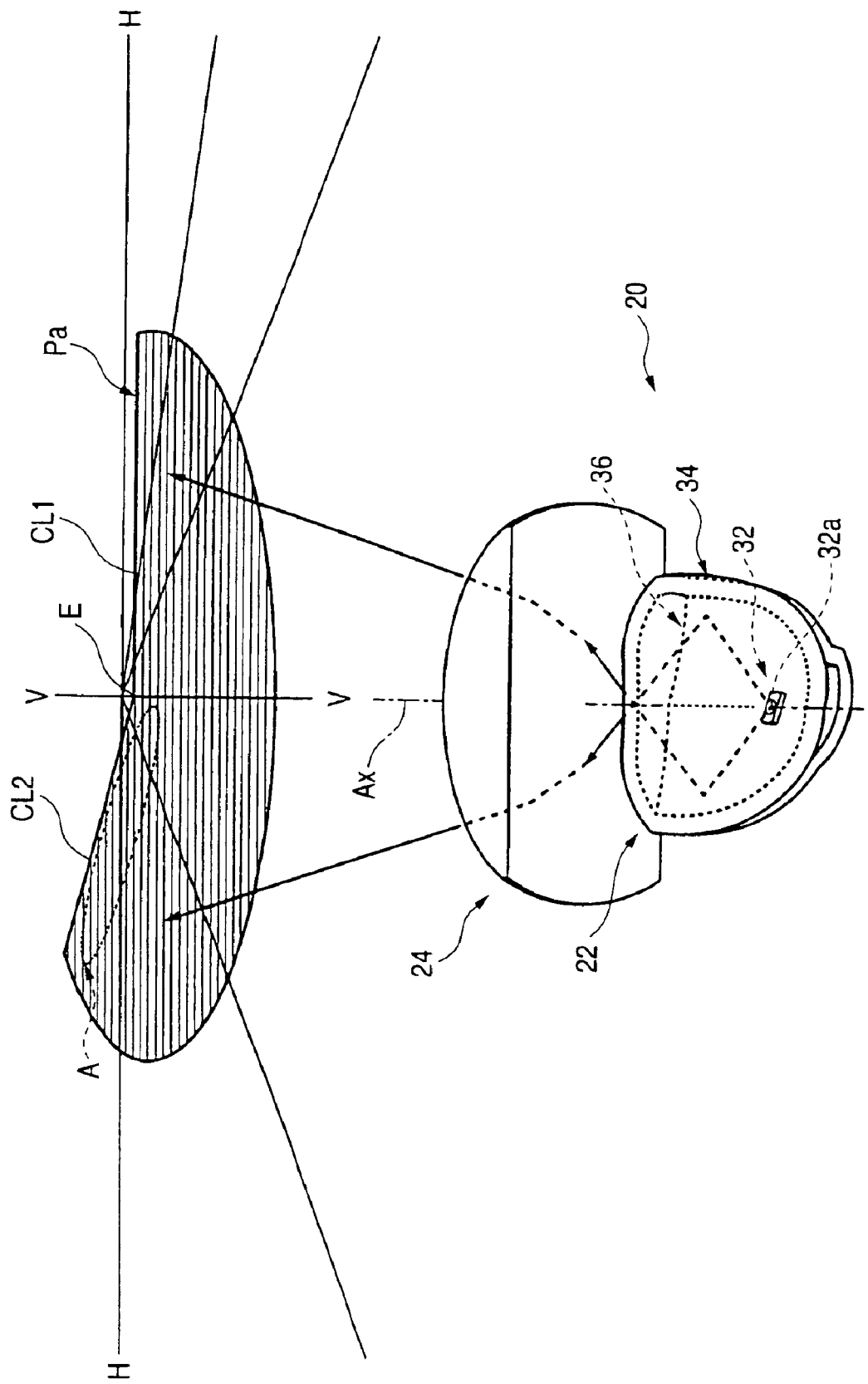
FIG. 5 is a perspective view showing a light distribution pattern formed on the virtual vertical screen by the irradiation of a light from the lighting unit of a projector type together with the lighting unit from the back side thereof.

FIG. 5 is a perspective view showing the cutoff line forming pattern Pa formed on the virtual vertical screen by the light irradiated forward from the lighting unit 20 together with the lighting unit 20 from the back side thereof.

As shown in FIG. 5, the cutoff line forming pattern Pa is formed as a light distribution pattern having horizontal and oblique cutoff lines CL1 and CL2 on an upper edge and having a certain diffusion angle with a comparatively uniform luminous intensity distribution.

In that case, the horizontal and oblique cutoff lines CL1 and CL2 are clearly formed as the inverted images of the shapes of the front edges of the horizontal cutoff formation surface 36a1 and the oblique cutoff formation surface 36a2 which constitute the light control surface 36a of the light control member 36.

In general, the light distribution curve of a light emitted from the light emitting diode has such a luminous intensity distribution that a luminous intensity is decreased when the front direction of the light emitting diode has a maximum luminous intensity and an angle in the front direction is increased. In the embodiment, the light emitting diode 32 is provided in a direction of a rightward rotation by 15 degrees around the optical axis Ax with respect to an upper part in a vertical direction, thereby brightly illuminating a lower region of the oblique cutoff line CL2 in the cutoff line forming pattern Pa, that is, a region A shown in a broken line of FIG. 5. Consequently, the light distribution pattern PL for a low beam to be a left distributed light is set to excel in providing distant visibility.

In the embodiment, three lighting units 20 are provided. Therefore, the cutoff line forming pattern Pa in the light distribution pattern PL for a low beam shown in FIG. 2 is obtained by superposing the cutoff line forming pattern Pa shown in FIG. 5 threefold.

Next, the structure of the lighting unit 40A of a direct projection type will be described.

Figure 6:
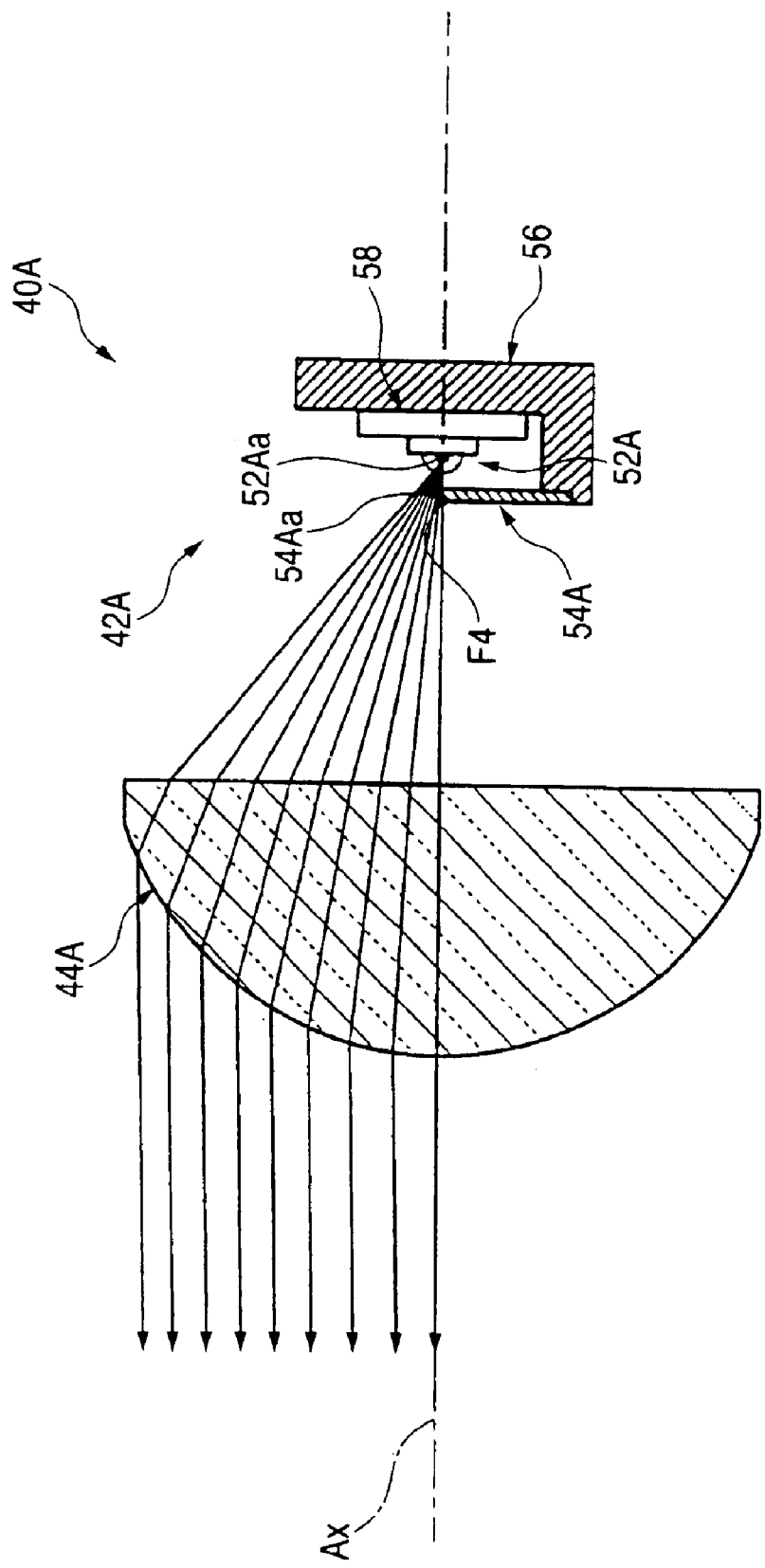
FIG. 6 is a sectional side view showing, as a single product, a lighting unit of a direct projection type in the headlamp for a vehicle.
Figure 7:
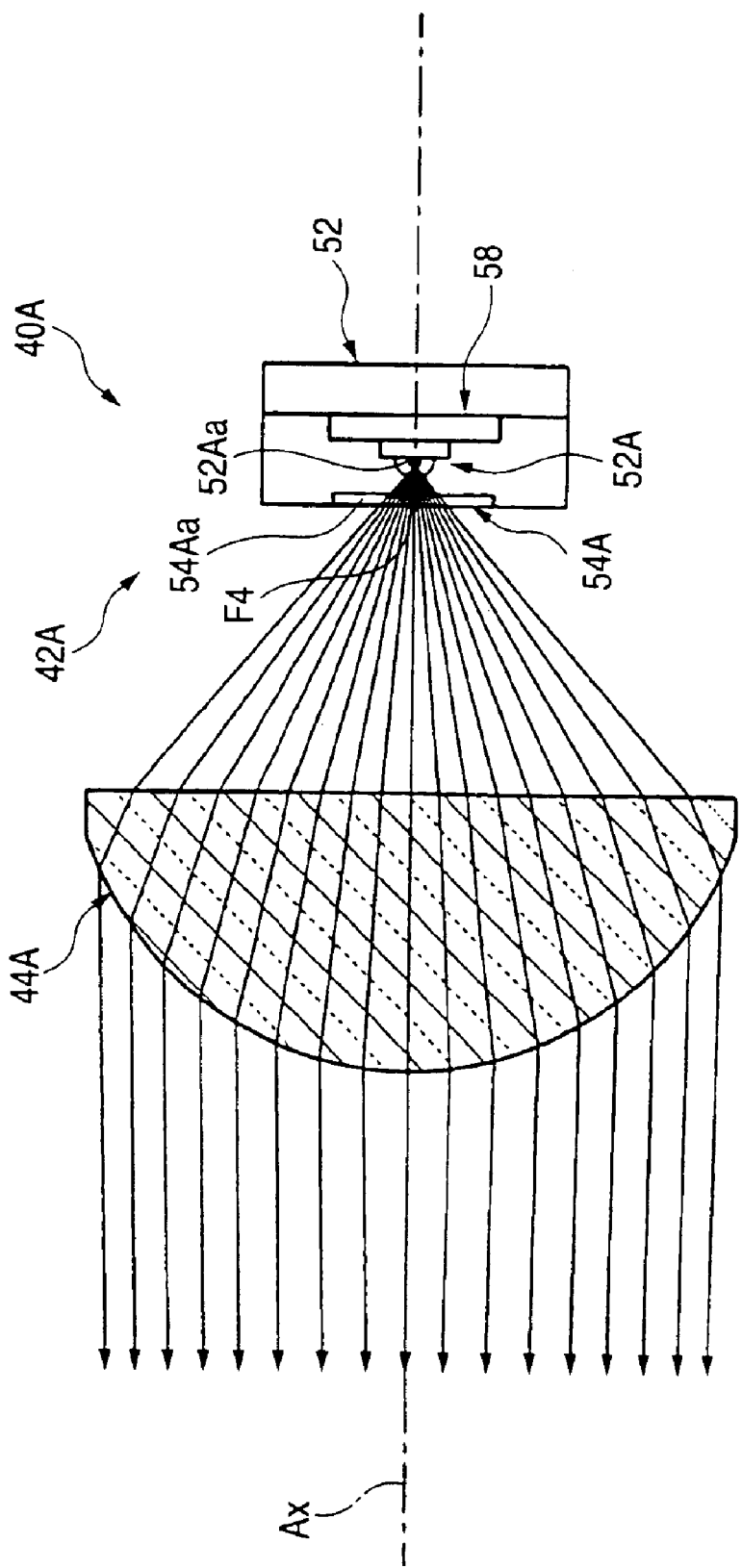
FIG. 7 is a sectional plan view showing the lighting unit of a direct projection type.

FIG. 6 is a side sectional view showing the lighting unit 40A as a single product and FIG. 7 is a sectional plan view thereof.

As shown in these drawings, a light source unit 42A of the lighting unit 40A comprises a light emitting diode 52A to be a light source and a shade 54A.

The light emitting diode 52A has the same structure as that of the light emitting diode 32 of the lighting unit 20 and is fixed to a support member 56 through a substrate 58 with a light emitting chip 52Aa turned forward from the lighting unit on the optical axis Ax.

The shade 54A is a plate-shaped member extended along a vertical plane which is orthogonal to the optical axis Ax in the vicinity of the forward part of the light emitting diode 52A and is fixed to the support member 56 with an upper edge 54Aa passing through the optical axis Ax in a horizontal direction.

The condenser lens 44A of the lighting unit 40A is constituted by a plano-convex lens in which a surface on the front side is convex and a surface on the rear side is plane. The condenser lens 44A is provided on the optical axis Ax with a focal point F4 on the rear side positioned on an intersection of the upper edge 54Aa of the shade 54A and the optical axis Ax.

In the lighting unit 40A, a light emitted from the light emitting diode 52A is changed into an almost parallel light converging slightly to the optical axis Ax by the condenser lens 44A and is inverted and irradiated forward, and furthermore, a light emitted from the light emitting diode 52A and directed downward from the optical axis Ax is shielded by the shade 54A so that an upward light can be prevented from being irradiated forward from the lighting unit.

Figure 8:
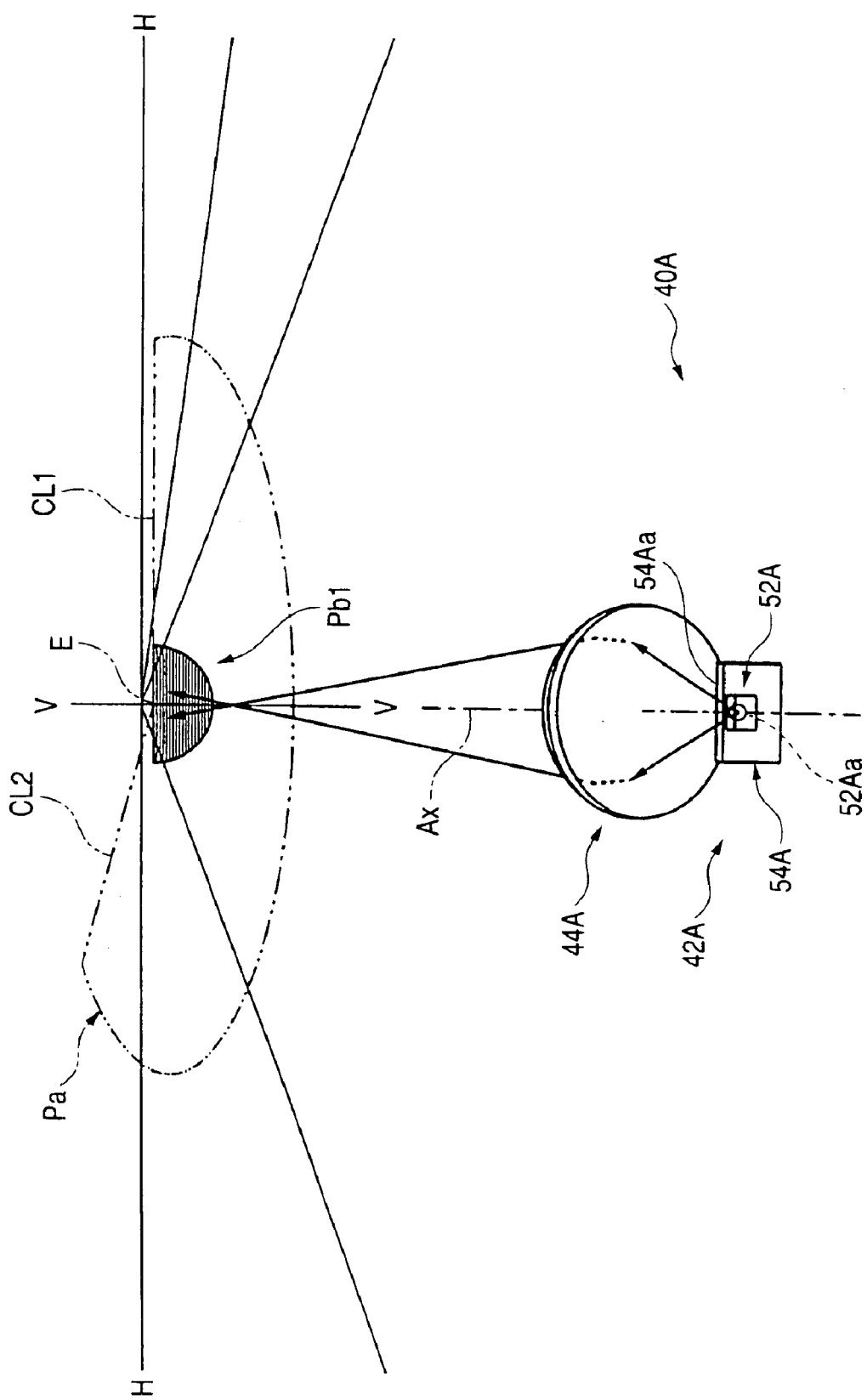
FIG. 8 is a perspective view showing a light distribution pattern formed on the virtual vertical screen by the irradiation of a light from the lighting unit of a direct projection type together with the lighting unit from the back side thereof.

FIG. 8 is a perspective view showing the small light distribution pattern Pb1 formed on the virtual vertical screen by the light irradiated forward from the lighting unit 40A together with the lighting unit 40A from the back side thereof.

As shown in FIG. 8, the small light distribution pattern Pb1 is formed as an almost semicircular spot-like light distribution pattern having a straight upper edge along the horizontal cutoff line CL1.

In the embodiment, the three lighting units 40A are provided with the optical axes Ax shifted slightly from each other in a transverse direction. Consequently, the three small light distribution patterns Pb1 are formed to partially overlap along the horizontal cutoff line CL1 in the vicinity of the elbow point E.

Figure 9:
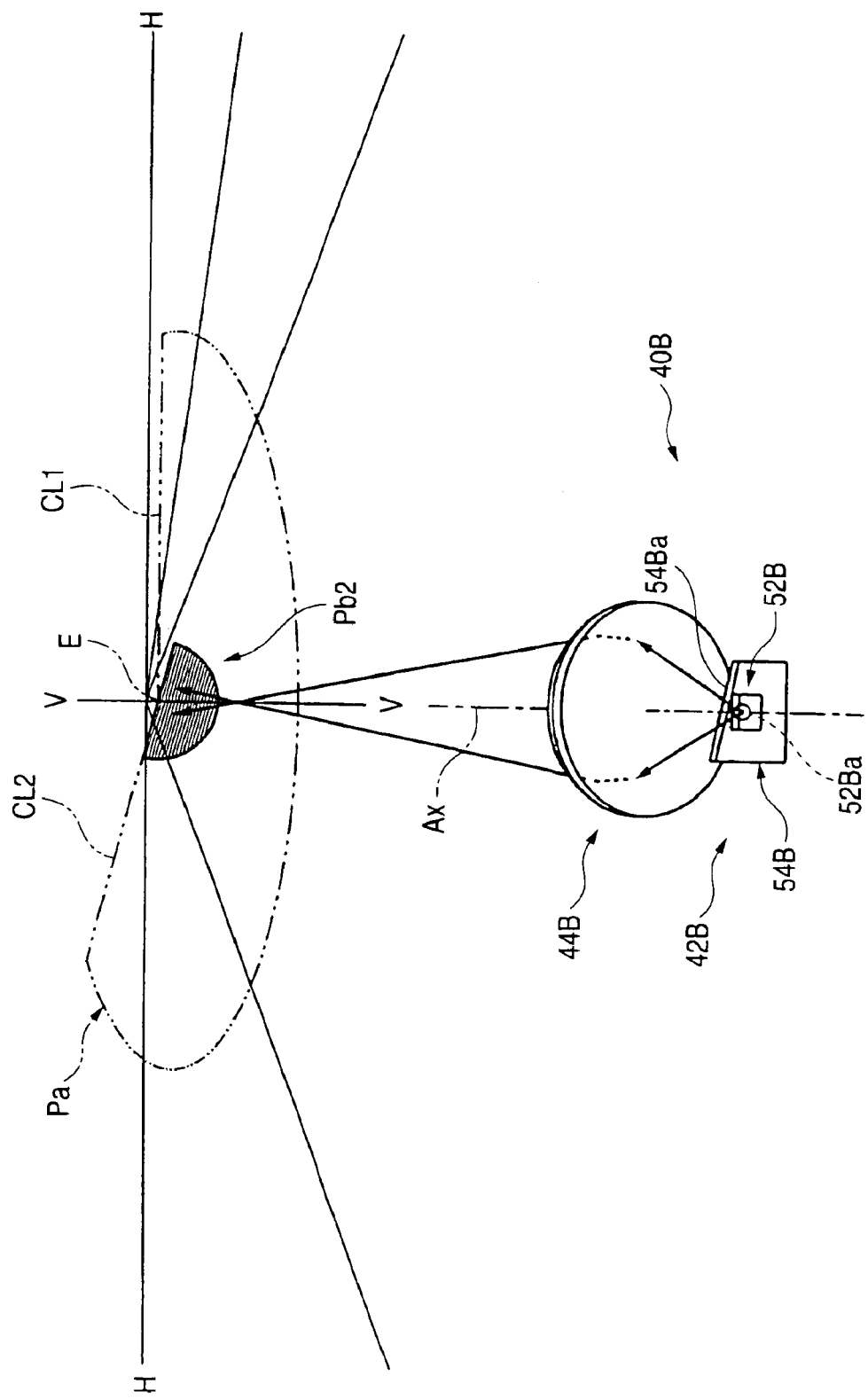
FIG. 9 is a perspective view showing a light distribution pattern formed on the virtual vertical screen by the irradiation of a light from another lighting unit of a direct projection type together with the lighting unit from the back side thereof.

FIG. 9 is a perspective view showing the small light distribution pattern Pb2 formed on the virtual vertical screen by the light irradiated forward from the lighting unit 40B together with the lighting unit 40B from the back side thereof.

As shown in FIG. 9, the light source unit 42B of the lighting unit 40B comprises a light emitting diode 52B to be a light source and a shade 54B in the same manner as the light source unit 42A of the lighting unit 40A, and is different from the light source unit 42A of the lighting unit 40A in that an upper edge 54Ba of the shade 54B is formed to pass through the optical axis Ax in an oblique direction, more specifically, a rightward and downward direction by 15 degrees with respect to a horizontal direction.

Thus, the upper edge 54Ba of the shade 54B is inclined. Consequently, the small light distribution pattern Pb2 is formed as an almost semicircular spot-like light distribution pattern having a straight upper edge along the oblique cutoff line CL2.

In the embodiment, the two lighting units 40B are provided with the optical axes Ax shifted slightly from each other in an oblique direction. Consequently, the two small light distribution patterns Pb2 are formed to partially overlap along the oblique cutoff line CL2 in the vicinity of the elbow point E.

The hot zone forming pattern Pb surrounding the elbow point E slightly to the left on the lower sides of the horizontal and oblique cutoff lines CL1 and CL2 as shown in FIG. 2 is formed as the synthetic light distribution pattern of the three small light distribution patterns Pb1 and the two small light distribution patterns Pb2. Consequently, a visibility in a distant region on the forward road surface of a vehicle is maintained.

Next, the structure of the lighting unit 60 of a reflection type will be described.

Figure 10:
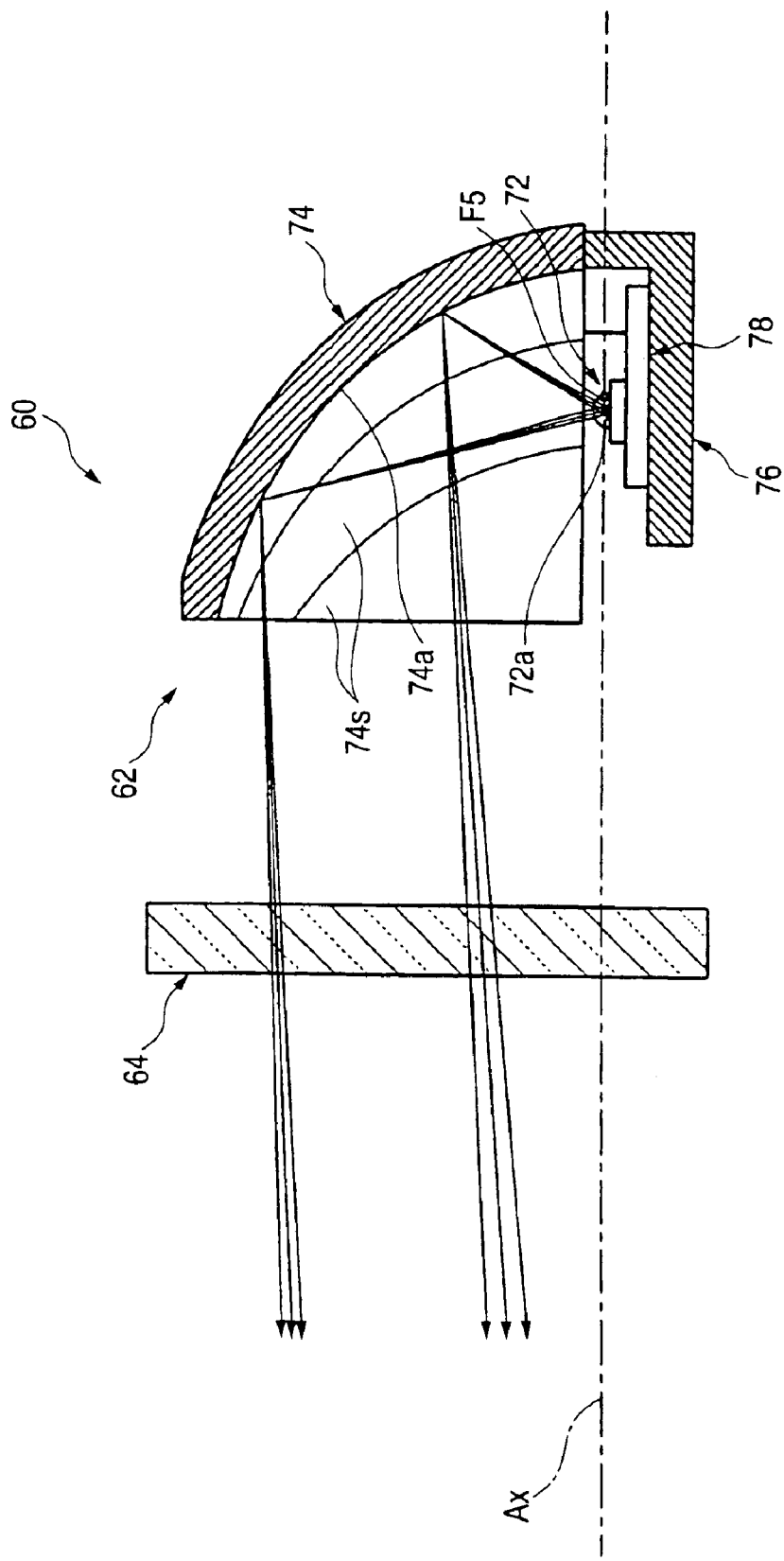
FIG. 10 is a sectional side view showing, as a single product, a lighting unit of a reflection type in the headlamp for a vehicle.
Figure 11:
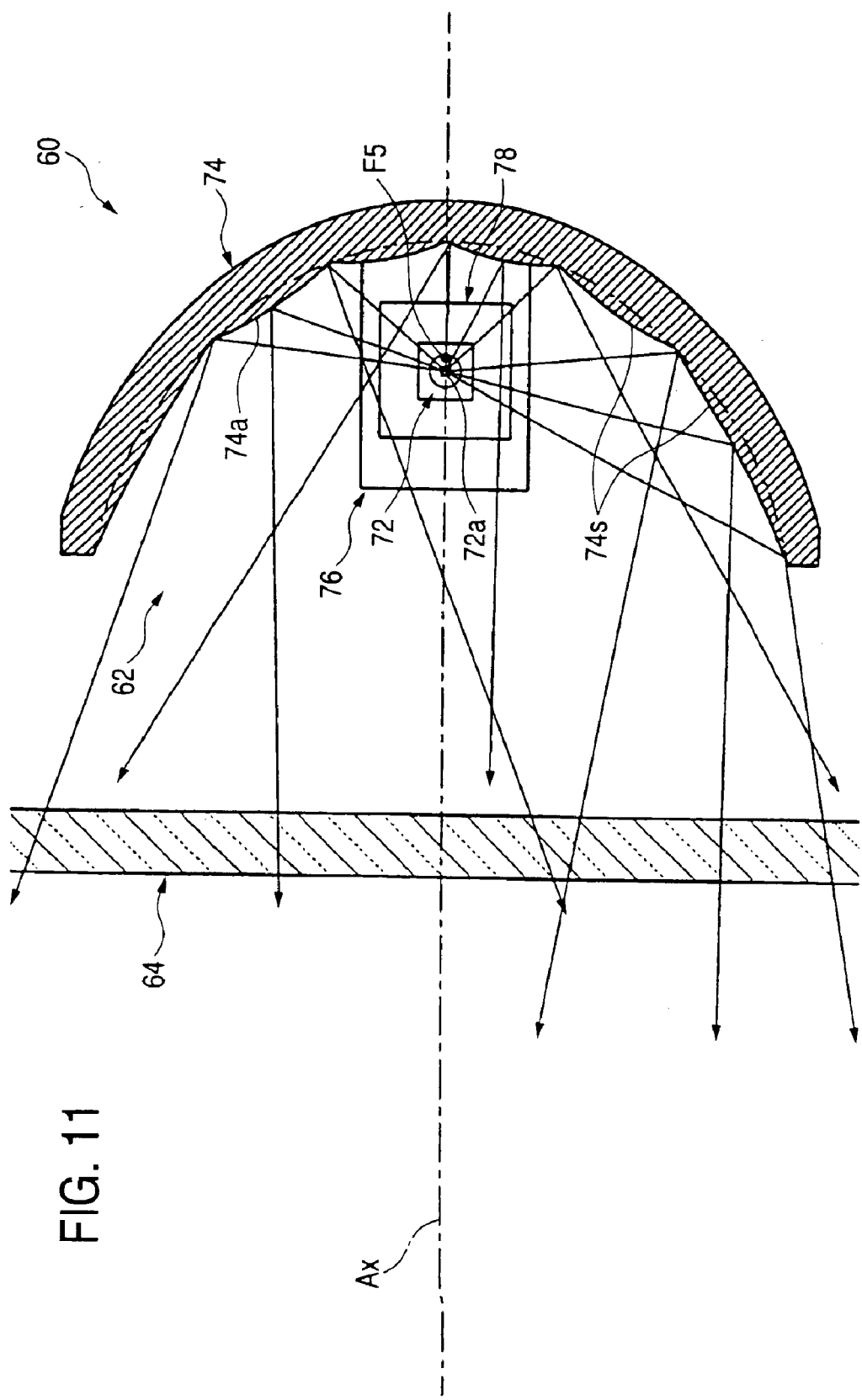
FIG. 11 is a sectional plan view showing the lighting unit of a reflection type.

FIG. 10 is a sectional side view showing the lighting unit 60 as a single product and FIG. 11 is a sectional plan view thereof.

As shown in these drawings, a light source unit 62 of the lighting unit 60 comprises a light emitting diode 72 to be a light source and a reflector 74.

The light emitting diode 72 has the same structure as that of the light emitting diode 32 of the lighting unit 20 and is provided on the optical axis Ax upward in a vertical direction, and is fixed to a support member 76 through a substrate 78 in this state.

The reflector 74 is provided above the light emitting diode 72 and has an almost parabolic reflecting plane 74a. The reflecting plane 74a has a plurality of diffusion reflecting elements 74s formed to be stripe-shaped on a rotary paraboloid in which the optical axis Ax is set to be a central axis and a slightly rear position from the light emitting chip 72 of the light emitting diode 72 on the optical axis Ax is set to be a focal point F5. These diffusion reflecting elements 74s have left and right diffusion reflection angles which are different from each other. The reflector 74 is fixed to the support member 76 at a lower end thereof.

In the lighting unit 60, a light emitted from the light emitting diode 72 is reflected forward as a slightly downward transverse diffused light by the reflector 74 and is exactly irradiated forward from the lighting unit through a translucent plate 64.

Figure 12:
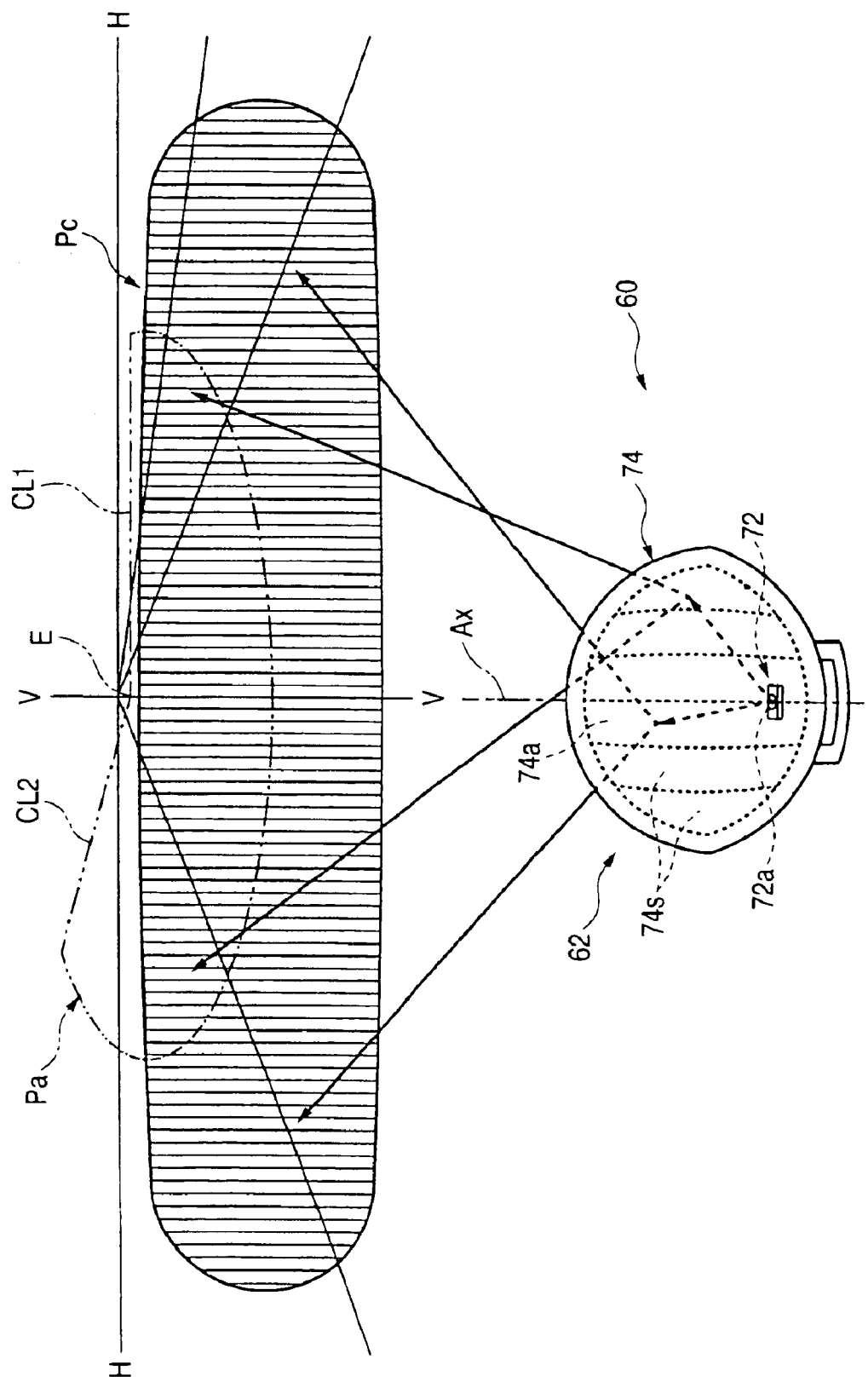
FIG. 12 is a perspective view showing a light distribution pattern formed on the virtual vertical screen by the irradiation of a light from the lighting unit of a reflection type together with the lighting unit from the back side thereof.

FIG. 12 is a perspective view showing the diffusion region forming pattern Pc formed on the virtual vertical screen by the light irradiated forward from the lighting unit 60 together with the lighting unit 60 from the back side thereof.

As shown in FIG. 12, the diffusion region forming pattern Pc is formed to be extended greatly toward the both left and right sides with respect to a V—V line to be a vertical line passing through H–V below the horizontal cutoff line CL1. Consequently, the forward road surface of a vehicle is illuminated over a wide range. In that case, the diffusion reflecting element 74s constituting the reflecting plane 74a of the reflector 74 has left and right diffusion reflection angles set to have different values from each other. Therefore, the diffusion region forming pattern Pc becomes a light distribution pattern in which a luminous intensity is gradually decreased toward a peripheral edge portion thereof.

In the embodiment, three lighting units 60 are provided. Therefore, the diffusion region forming pattern Pc in the light distribution pattern PL for a low beam shown in FIG. 2 is obtained by superposing the diffusion region forming pattern Pc shown in FIG. 12 threefold.

As described above in detail, the headlamp 10 for a vehicle according to the embodiment comprises a plurality of lighting units 20, 40A, 40B and 60 using the light emitting diodes 32, 52A, 52B and 72 as the light sources. Consequently, it is possible to reduce the sizes of the lighting units 20, 40A, 40B and 60. Thus, it is possible to increase the degree of freedom of the shape of the headlamp 10 for a vehicle and to reduce a size thereof.

In the embodiment, moreover, the cutoff line forming unit 20, the hot zone forming units 40A and 40B and the diffusion region forming unit 60 are formed as these lighting units. By properly combining these three kinds of lighting units, therefore, it is possible to obtain the light distribution pattern PL for a low beam having a desirable pattern shape and luminous intensity distribution.

In the embodiment, particularly, the lighting unit of a projector type is used as the cutoff line forming unit 20. Therefore, the horizontal and oblique cutoff lines CL1 and CL2 can have high contrast ratios. Consequently, it is possible to minimize the generation of an upward light causing a glare. Moreover, the cutoff line forming pattern Pa can be changed into a light distribution pattern having a certain diffusion angle with a comparatively uniform luminous intensity distribution. Since the lighting unit of a direct projection type is used as the hot zone forming units 40A and 40B, furthermore, the hot zone forming pattern Pb can easily be formed as a spot-like light distribution pattern. In addition, since the lighting unit of a reflection type is used as the diffusion region forming unit 60, the diffusion region forming pattern Pc can be formed as a light distribution pattern having a great diffusion angle. The light distribution pattern PL for a low beam formed as their synthetic light distribution pattern can easily be formed with a desirable pattern shape and luminous intensity distribution.

In addition, in the embodiment, the hot zone forming pattern Pb is formed to surround the elbow point E slightly to the left on the lower sides of the horizontal and oblique cutoff lines CL1 and CL2 as the synthetic light distribution pattern of the three small light distribution patterns Pb1 formed to partially overlap along the horizontal cutoff line CL1 in the vicinity of the elbow point E and the two small light distribution patterns Pb2 formed to partially overlap along the oblique cutoff line CL2 in the vicinity of the elbow point E. Therefore, it is possible to fully maintain the visibility of a distant region on the forward road surface of the vehicle.

In the embodiment, moreover, the three cutoff line forming units 20, the five hot zone forming units 40A and 40B and the three diffusion region forming units 60 are provided in three upper and lower stages with the three cutoff line forming units 20 positioned in the middle stage. If the optical axis of any of the three cutoff line forming units 20, which is positioned on a center, is regulated and the optical axes of the other lighting units are then regulated, therefore, the optical axis of each lighting unit can easily be regulated. Consequently, it is possible to smoothly regulate the position in which the light distribution pattern PL for a low beam is to be formed.

While the description has been given to the headlamp 10 for a vehicle according to the embodiment on the assumption that the eleven lighting units 20, 40A, 40B and 60 are provided in the three upper and lower stages, it is a matter of course that the total number of the lighting units or the number and arrangement of the lighting units 20, 40A, 40B and 60 may be properly changed depending on the pattern shape and luminous intensity distribution of the light distribution pattern PL for a low beam desired.

In the embodiment, moreover, the lighting unit 60 of a reflection type forms the diffusion region forming pattern Pc by a plurality of diffusion reflecting elements 74s formed on the reflecting plane 74a of the reflector 74. Instead, it is also possible to form the diffusion region forming pattern Pc by constituting the reflecting plane 74a by the rotary paraboloid and forming a diffusion lens element on the translucent plate 64.

What is claimed is:

1. A headlamp for a vehicle which is constituted to form a light distribution pattern for a low beam, comprising:
   a plurality of lighting units using semiconductor light emitting elements as light sources,
   wherein a cutoff line forming unit for carrying out a light irradiation to form a cutoff line of the light distribution pattern for a low beam, a hot zone forming unit for carrying out a light irradiation to form a hot zone of the light distribution pattern for a low beam and a diffusion region forming unit for carrying out a light irradiation to form a diffusion region of the light distribution pattern for a low beam are used as the lighting units;
   wherein the cutoff line forming unit, the hot zone forming unit and the diffusion region forming unit are provided in three stages; said three stages being an upper stage, lower stage, and middle stage; and said cutoff line forming unit is positioned in the middle stage.

2. The headlamp for a vehicle according to claim 1, wherein the cutoff line forming unit includes a lighting unit of a projector type which is constituted to reflect a light emitted from a light source to be converged forward by a reflector and to irradiate the reflected light forward from the lighting unit through a projection lens provided in a forward part of the reflector.

3. The headlamp for a vehicle according to claim 1, wherein the hot zone forming unit includes a lighting unit of a direct projection type which is constituted to irradiate a direct light emitted from the light source forward from the lighting unit through a condenser lens provided in a forward part of the light source.

4. The headlamp for a vehicle according to claim 1, wherein the diffusion region forming unit includes a lighting unit of a reflection type which is constituted to reflect a light emitted from the light source forward from the lighting unit by the reflector.

5. The headlamp for a vehicle according to claim 1, wherein the cutoff line forming unit includes a lighting unit of a projector type which is constituted to reflect a light emitted from a light source to be converged forward by a reflector and to irradiate the reflected light forward from the lighting unit through a projection lens provided in a forward part of the reflector, the hot zone forming unit includes a lighting unit of a direct projection type which is constituted to irradiate a direct light emitted from the light source forward from the lighting unit through a condenser lens provided in a forward part of the light source, and the diffusion region forming unit includes a lighting unit of a reflection type which is constituted to reflect a light emitted from the light source forward from the lighting unit by the reflector.

6. A headlamp, comprising:

a plurality of lighting units operable to form a light distribution pattern, the plurality of lighting units comprising:

a cutoff line forming unit operable to carry out a light irradiation to form a cutoff line of the light distribution pattern;

a hot zone forming unit operable to carry out a light irradiation to form a hot zone of the light distribution pattern; and a diffusion region forming unit operable to carry out a light irradiation to form a diffusion region of the light distribution pattern;

wherein the cutoff line forming unit, the hot zone forming unit and the diffusion region forming unit are provided in three stages; said three stages being an upper stage, lower stage, and middle stage; and said cutoff line forming unit is positioned in the middle stage.

7. The headlamp according to claim 6, wherein the plurality of lighting units include semiconductor light emitting elements as light sources.

* * * * *